United States Patent
Chen et al.

(10) Patent No.: US 11,748,872 B2
(45) Date of Patent: Sep. 5, 2023

(54) SETTING UP INSPECTION OF A SPECIMEN

(71) Applicant: KLA Corporation, Milpitas, CA (US)

(72) Inventors: Hong Chen, San Ramon, CA (US); Bjorn Brauer, Beaverton, OR (US); Abdurrahman Sezginer, Monte Sereno, CA (US); Sangbong Park, Union City, CA (US); Ge Cong, Pleasanton, CA (US); Xiaochun Li, San Jose, CA (US)

(73) Assignee: KLA Corp., Milpitas, CA (US)

(*) Notice: Subject to any disclaimer, the term of this patent is extended or adjusted under 35 U.S.C. 154(b) by 305 days.

(21) Appl. No.: 17/165,826

(22) Filed: Feb. 2, 2021

(65) Prior Publication Data

US 2022/0067898 A1 Mar. 3, 2022

Related U.S. Application Data

(60) Provisional application No. 63/072,939, filed on Aug. 31, 2020.

(51) Int. Cl.
| | |
|---|---|
| G06T 7/00 | (2017.01) |
| G01N 21/88 | (2006.01) |
| G06T 3/40 | (2006.01) |

(52) U.S. Cl.
CPC ......... G06T 7/001 (2013.01); G01N 21/8806 (2013.01); G01N 21/8851 (2013.01); G06T 3/4007 (2013.01); G01N 2021/8861 (2013.01); G01N 2021/8887 (2013.01); G06T 2207/30148 (2013.01)

(58) Field of Classification Search
CPC .......... G06T 7/001; G06T 3/4007; G06T 2207/30148; G06T 2207/20021; G06T 2207/20224; G01N 21/8806; G01N 21/8851; G01N 2021/8861; G01N 2021/8887; G01N 2021/8883; G01N 2021/95676; G01N 21/9501
See application file for complete search history.

(56) References Cited

U.S. PATENT DOCUMENTS

| | | | |
|---|---|---|---|
| 5,602,645 A | * | 2/1997 | Tabata ............. G03F 1/84 356/394 |
| 7,570,796 B2 | | 8/2009 | Zafar et al. |
| 7,676,077 B2 | | 3/2010 | Kulkarni et al. |
| 8,126,255 B2 | | 2/2012 | Bhaskar et al. |
| 8,664,594 B1 | | 3/2014 | Jiang et al. |
| 8,692,204 B2 | | 4/2014 | Kojima et al. |

(Continued)

OTHER PUBLICATIONS

International Search Report and Written Opinion for PCT/US2021/047425 dated Dec. 15, 2021.

*Primary Examiner* — Roy M Punnoose
(74) *Attorney, Agent, or Firm* — Ann Marie Mewherter

(57) ABSTRACT

Methods and systems for setting up inspection of a specimen are provided. One system includes one or more computer subsystems configured for acquiring a reference image for a specimen and modifying the reference image to fit the reference image to a design grid thereby generating a golden grid image. The one or more computer subsystems are also configured for storing the golden grid image for use in inspection of the specimen. The inspection includes aligning a test image of the specimen generated from output of an inspection subsystem to the golden grid image.

25 Claims, 4 Drawing Sheets

(56) References Cited

U.S. PATENT DOCUMENTS

| | | | |
|---|---|---|---|
| 8,698,093 B1 | 4/2014 | Gubbens et al. | |
| 8,716,662 B1 | 5/2014 | MacDonald et al. | |
| 9,092,846 B2 * | 7/2015 | Wu | G01N 21/8851 |
| 9,222,895 B2 * | 12/2015 | Duffy | G06T 7/50 |
| 10,186,026 B2 | 1/2019 | Karsenti et al. | |
| 2003/0086603 A1 * | 5/2003 | Davidson | G06T 17/10 |
| | | | 382/154 |
| 2004/0175028 A1 * | 9/2004 | Cavan | G06T 3/4069 |
| | | | 382/145 |
| 2006/0262147 A1 * | 11/2006 | Kimpe | G09G 3/20 |
| | | | 345/690 |
| 2009/0238446 A1 * | 9/2009 | Kataoka | G06T 7/0004 |
| | | | 382/152 |
| 2012/0087568 A1 * | 4/2012 | Stellari | G06T 3/0081 |
| | | | 382/294 |
| 2012/0114221 A1 | 5/2012 | Satou et al. | |
| 2016/0292840 A1 * | 10/2016 | Konecky | G06T 7/001 |
| 2016/0321800 A1 * | 11/2016 | Thattaisundaram | |
| | | | G01N 21/95607 |
| 2017/0018064 A1 * | 1/2017 | Seidel | G06T 7/001 |
| 2017/0200265 A1 * | 7/2017 | Bhaskar | G03F 1/86 |
| 2017/0345142 A1 | 11/2017 | Brauer et al. | |
| 2018/0101940 A1 | 4/2018 | Sohn et al. | |
| 2019/0355546 A1 * | 11/2019 | Ando | H01J 37/141 |

\* cited by examiner

SETTING UP INSPECTION OF A SPECIMEN

BACKGROUND OF THE INVENTION

1. Field of the Invention

The present invention generally relates to methods and systems for setting up inspection of a specimen.

2. Description of the Related Art

The following description and examples are not admitted to be prior art by virtue of their inclusion in this section.

Inspection processes are used at various steps during a semiconductor manufacturing process to detect defects on reticles and wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

There are many factors that affect defect count stability of inspection tools from scan to scan. One of the main factors is pixel location change from scan to scan. For example, many currently used inspections are setup and/or are performed based on design information for the specimen being inspected. In one such example, care areas may be generated from design in setup and then applied to test images in runtime using pixel to design alignment (PDA) offsets (runtime test image to design offsets). In another such example, test images may be aligned to design and then attributes for defects detected in the test images may be determined from the design aligned thereto.

The success of such design based inspections can therefore rest on, at least in part, how well test images can be aligned to design and/or differences between alignment from mode to mode, specimen to specimen, and tool to tool. For example, it may not only be difficult to align test images to design with substantially high accuracy, but the accuracy with which such alignment can be performed may vary from scan to scan, mode to mode, tool to tool, etc. due to process and specimen variation. With currently used methods, this variation can cause defects to be assigned to different regions from scan to scan which can result in detected region change or even defect loss and unstable defect attributes.

The currently used methods and systems have, therefore, several disadvantages. For example, run time context map (RTCM) care areas from design can be shifted by pixel to design alignment (PDA) offset between runtime test images and design. Then, RTCM care areas are rendered on top of runtime test images. Due to pixel location variation from scan to scan, RTCM region map can change which causes defect count variation from scan to scan. In another example, some of the defect attributes may be computed from reference patch images of defects. These defect attributes can capture underlying design structure information for defects such as reference context pattern. Reference contrast is another useful defect attribute which can be used to filter out nuisances. Due to scan to scan variation, reference patch-based attributes are not stable.

Accordingly, it would be advantageous to develop systems and methods for setting up inspection of a specimen that do not have one or more of the disadvantages described above.

SUMMARY OF THE INVENTION

The following description of various embodiments is not to be construed in any way as limiting the subject matter of the appended claims.

One embodiment relates to a system configured for setting up inspection of a specimen. The system includes an inspection subsystem configured to generate output responsive to energy detected from a specimen. The system also includes one or more computer subsystems configured for acquiring a reference image for the specimen and modifying the reference image to fit the reference image to a design grid thereby generating a golden grid image. The one or more computer subsystems are further configured for storing the golden grid image for use in inspection of the specimen. The inspection includes aligning a test image of the specimen generated from the output of the inspection subsystem to the golden grid image. The system may be further configured as described herein.

Another embodiment relates to a computer-implemented method for setting up inspection of a specimen. The method includes acquiring a reference image for a specimen and modifying the reference image to fit the reference image to a design grid thereby generating a golden grid image. The method further includes storing the golden grid image for use in inspection of the specimen. The inspection includes aligning a test image of the specimen generated from output of an inspection subsystem responsive to energy detected from the specimen to the golden grid image. The acquiring, modifying, and storing steps are performed by one or more computer subsystems.

Each of the steps of the method described above may be performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for setting up inspection of a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
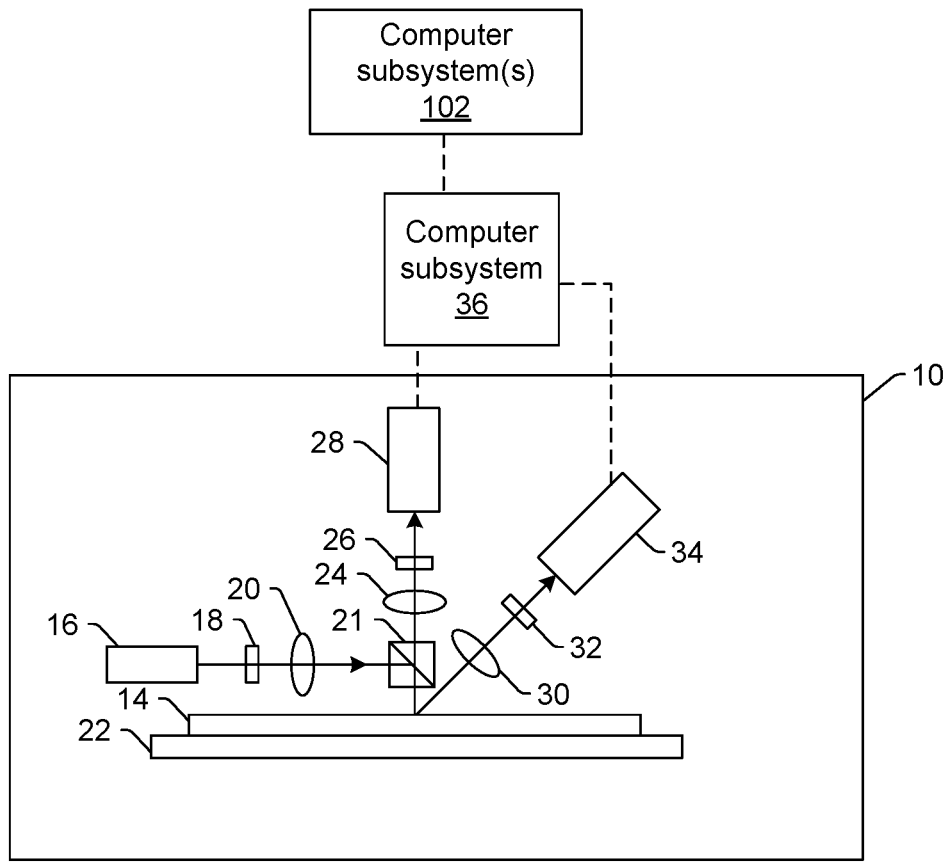
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

"Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlying layers or materials on the specimen, line edge roughness (LER), relatively small critical dimension (CD) variation in patterned features, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

The terms "design" and "design data" as used herein generally refer to the physical design (layout) of an IC and data derived from the physical design through complex simulation or simple geometric and Boolean operations. The physical design may be stored in a data structure such as a graphical data stream (GDS) file, any other standard machine-readable file, any other suitable file known in the art, and a design database. A GDSII file is one of a class of files used for the representation of design layout data. Other examples of such files include GL1 and OASIS files and proprietary file formats such as RDF data, which is proprietary to KLA Corp., Milpitas, Calif. In addition, the "design" and "design data" described herein refers to information and data that is generated by semiconductor device designers in a design process and is therefore available for use in the embodiments described herein well in advance of printing of the design on any physical wafers. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured for setting up inspection of a specimen. Some embodiments relate to inspection tool process variation control using a golden grid.

In one embodiment, the specimen is a wafer. The wafer may include any wafer known in the semiconductor arts. In another embodiment, the specimen is a reticle. The reticle may include any reticle known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

The system includes an inspection subsystem configured to generate output responsive to energy detected from a specimen. One embodiment of such a system is shown in FIG. 1. In some embodiments, the inspection subsystem includes at least an energy source and a detector. The energy source is configured to generate energy that is directed to a specimen. The detector is configured to detect energy from the specimen and to generate output responsive to the detected energy.

In one embodiment, the inspection subsystem is a light-based inspection subsystem. For example, in the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different angle of incidence.

In some instances, the inspection subsystem may be configured to direct light to the specimen at more than one angle of incidence at the same time. For example, the inspection subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser, which may be any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for inspection.

The inspection subsystem may also include a scanning subsystem configured to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection subsystem may be configured such that one or more optical elements of the inspection subsystem perform some scanning of the light over the specimen. The light may be scanned over the specimen in any suitable fashion.

The inspection subsystem further includes one or more detection channels. At least one of the one or more detection channels includes a detector configured to detect light from the specimen due to illumination of the specimen by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 of the system may be configured to generate images of the specimen from the non-imaging output of the detectors. However, in other instances, the detectors may be configured as imaging detectors that are configured to generate imaging signals or image data. Therefore, the system may be configured to generate images in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 29xx and 39xx series of tools that are commercially available from KLA. For some such systems, the embodiments described herein may be provided as optional functionality of the inspection system (e.g., in addition to other functionality of the inspection system). Alternatively, the inspection subsystem described herein may be designed "from scratch" to provide a completely new inspection system.

Computer subsystem 36 of the system may be coupled to the detectors of the inspection subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based subsystem, the inspection subsystem may be an electron-based inspection subsystem. For example, in one embodiment, the energy directed to the specimen includes electrons, and the energy detected from the specimen includes electrons. In this manner, the energy source may be an electron beam source. In one such embodiment shown in FIG. 2, the inspection subsystem includes electron column 122, which is coupled to computer subsystem 124.

Figure 2:
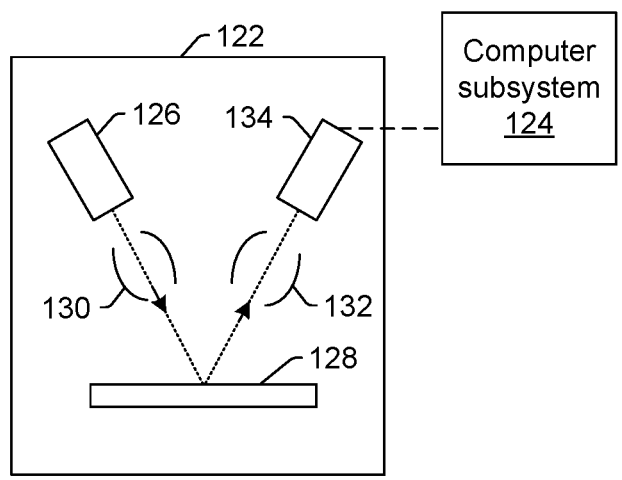

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam subsystem may be configured to use multiple modes to generate images of the specimen (e.g., with different illumination angles, collection angles, etc.). The multiple modes of the electron beam subsystem may be different in any image generation parameter(s) of the subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the inspection subsystem shown in FIG. 2 may be further configured as described herein.

It is noted that FIG. 2 is provided herein to generally illustrate a configuration of an electron-based inspection subsystem that may be included in the embodiments described herein. As with the optical subsystem described above, the electron beam subsystem configuration described herein may be altered to optimize the performance of the subsystem as is normally performed when designing a commercial inspection system. In addition, the systems described herein may be implemented using an existing inspection system (e.g., by adding functionality described herein to an existing inspection system). For some such systems, the embodiments described herein may be provided as optional functionality of the system (e.g., in addition to other functionality of the system). Alternatively, the system described herein may be designed "from scratch" to provide a completely new system.

Although the inspection subsystem is described above as being a light-based or electron beam-based subsystem, the inspection subsystem may be an ion beam-based subsystem. Such an inspection subsystem may be configured as shown in FIG. 2 except that the electron beam source may be replaced with any suitable ion beam source known in the art. In one embodiment, therefore, the energy directed to the specimen includes ions. In addition, the inspection subsystem may be any other suitable ion beam-based inspection subsystem such as those included in commercially available focused ion beam (FIB) systems, helium ion microscopy (HIM) systems, and secondary ion mass spectroscopy (SIMS) systems.

The inspection subsystems described herein may be configured to generate output, e.g., images, of the specimen with multiple modes. In general, a "mode" is defined by the values of parameters of the inspection subsystem used for generating output and/or images of a specimen (or the output used to generate images of the specimen). Therefore, modes may be different in the values for at least one of the parameters of the inspection subsystem (other than position on the specimen at which the output is generated). For example, in an optical subsystem, different modes may use different wavelength(s) of light for illumination. The modes may be different in the illumination wavelength(s) as described further herein (e.g., by using different light sources, different spectral filters, etc. for different modes). In another example, different modes may use different illumination channels of the optical subsystem. For example, as noted above, the optical subsystem may include more than one illumination channel. As such, different illumination channels may be used for different modes. The modes may also or alternatively be different in one or more collection/detection parameters of the optical subsystem. The modes may be different in any one or more alterable parameters (e.g., illumination polarization(s), angle(s), wavelength(s), etc., detection polarization(s), angle(s), wavelength(s), etc.) of the inspection subsystem. The inspection subsystem may be configured to scan the specimen with the different modes in the same scan or different scans, e.g., depending on the capability of using multiple modes to scan the specimen at the same time.

In a similar manner, the output generated by the electron beam subsystem may include output, e.g., images, generated by the electron beam subsystem with two or more different values of a parameter of the electron beam subsystem. The multiple modes of the electron beam subsystem can be defined by the values of parameters of the electron beam subsystem used for generating output and/or images for a specimen. Therefore, modes may be different in the values for at least one of the electron beam parameters of the electron beam subsystem. For example, different modes may use different angles of incidence for illumination.

The subsystems described herein and shown in FIGS. 1 and 2 may be modified in one or more parameters to provide different output generation capability depending on the application for which they will be used. In one such example, the inspection subsystem shown in FIG. 1 may be configured to have a higher resolution if it is to be used for defect review or metrology rather than for inspection. In other words, the embodiments of the inspection subsystems shown in FIGS. 1 and 2 describe some general and various configurations for an inspection subsystem that can be tailored in a number of manners that will be obvious to one skilled in the art to produce inspection subsystems having different output generation capabilities that are more or less suitable for different applications.

As noted above, the optical, electron, and ion beam subsystems are configured for scanning energy (e.g., light, electrons, etc.) over a physical version of the specimen thereby generating output for the physical version of the specimen. In this manner, the optical, electron, and ion beam subsystems may be configured as "actual" subsystems, rather than "virtual" subsystems. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

The computer subsystem(s) are configured for acquiring a reference image for the specimen. For example, as shown in step 300 of FIG. 3, the computer subsystem(s) are configured to acquire a reference image. In general, the reference image may be any reference image that is not generated from the design for the specimen. For example, as described further herein, the embodiments use the reference image to generate a golden grid image by fitting the reference image to a design grid.

Acquiring the reference image may include scanning the specimen with the inspection subsystem to generate an image of the specimen that will be used as the reference image. Acquiring the reference image in this manner may be performed in any suitable manner known in the art, e.g., by scanning one or more printed instances of a die or other repeating structure on a specimen. The reference image used in steps described herein may be the raw output of a detector of the inspection subsystem that may or may not have been processed in some manner. In addition, the reference image that is acquired may be generated from multiple printed instances of a repeating structure on the specimen in any suitable manner, e.g., by averaging, robust averaging that excludes outliers (defects), etc. As such, the computer subsystem(s) may acquire the reference image simply by causing the inspection subsystem to generate the detector output that is used as the reference image or by some combination of causing the inspection subsystem to physically scan the specimen and performing one or more image processing steps on the detector output.

Acquiring the reference image may not include scanning the specimen, however. For example, another system or method may generate the reference image and store the reference image in a storage medium (not shown), which is accessible to the computer subsystem(s). Acquiring the reference image may then include accessing and retrieving the reference image from the storage medium.

As described further herein, some inspection processes are performed with more than one mode of the inspection subsystem, and those modes can be defined as described further herein. If an inspection process is performed with more than one mode, chances are that a different reference image will be needed for each mode. In other words, due to the differences in the modes, which provide advantages for inspection, the images generated by those modes will be different enough that a different reference image may be needed for each mode. In such instances, therefore, acquiring a reference image may include acquiring a first reference image for a first mode, acquiring a second reference image for a second mode, and so on. Each of the reference images may be acquired by the inspection subsystem as described above. For example, the computer subsystem(s) may cause the inspection subsystem to scan a repeating structure on the specimen with each mode thereby acquiring a reference image for each mode. Each reference image for each mode may also be processed as described herein. In other words, the steps described herein may be separately and independently performed for each mode used in the inspection process.

Acquiring the reference image as described above may be performed during a setup phase performed prior to runtime of the inspection process. Acquiring the reference image (and other steps described herein) may also be performed anytime that the inspection process is updated, modified, calibrated, re-trained, etc. In this manner, "setting up an inspection process" as described herein may include setting up a new inspection process or modifying an existing process.

The computer subsystem(s) are also configured for modifying the reference image to fit the reference image to a design grid thereby generating a golden grid image. The term "design grid" as used herein can be generally defined as a uniform grid defined across and within the design for the specimen. The term "design grid" can also be used interchangeably with the term "golden grid." Every pixel within the design grid has the same size, and pixels along the x and y directions are perfectly aligned. The design grid is therefore like a digital coordinate system. In other words, the entire design (or at least the portion of the design that will be inspected in the inspection process) may be subdivided in design space into significantly smaller areas (referred to herein as pixels), each of which has the same dimensions and are arranged in a uniform two-dimensional (2D) array, thereby defining the design grid. In one hypothetical example, a design grid for a die may include a 2D array of pixels arranged in 256 columns and 256 rows, and each pixel may have the same x and y dimensions. Of course, different design grids may be defined for a design and for different designs depending on various factors such as the designs themselves, the characteristics (e.g., resolution) of the inspection images that will be generated for specimens on which the design is formed, the inspection process being performed on the specimens using the images, user-specified parameters, etc. Nevertheless, the design grids should, for the embodiments described herein, be uniform in pixel arrangement and dimensions. In contrast, in specimen images, due to inherent marginalities in the specimen and/or inspection subsystem such as optical distortion and image jitter, pixel size can vary slightly from pixel to pixel and pixels along the x and y directions can be tilted slightly.

As described further herein, the embodiments provide a golden grid approach, which has various applications for quality control type tools and methods such as inspection tool stability control. The golden grid image may be generated and saved during training (also called setup) step(s) or phase of the inspection. The golden grid image may be a golden grid die image or a golden grid image for another repeating printed instance on a specimen. For example, the golden grid image may be a golden grid field image, a golden grid memory array image, a golden grid device area image, a golden grid cell image, etc.

The reference image may undergo one or more optional processing steps prior to, during, or after the modifying step described above. For example, in one embodiment, generating the golden grid image includes removing random defects from the reference image. As shown in step 302 of FIG. 3, the one or more computer subsystems may remove random defects from the reference image. (Optional steps are shown in the figures with dashed lines.) Removing random defects from the reference image may be performed in any suitable manner known in the art. One example of how random defects can be removed from the reference image is by robust averaging the detector output from multiple instances of a repeating structure (e.g., dies) on the specimen. Robust averaging performed in the embodiments described herein may rank multiple instances of a repeating structure, remove outliers (likely corresponding to defects), and then average the remaining instances. In this manner, the golden grid image may be a processed image generated, possibly in part, by removing random defects.

In another embodiment, generating the golden grid image includes removing a signature specific to the inspection subsystem from the reference image. As shown in step 304 of FIG. 3, the computer subsystem(s) may remove a tool signature from the reference image. For example, the golden grid image is preferably free from tool specific signatures such as tool optical distortion, stage movement related uncertainty, color variation, etc. Such distortion correction may be performed in any suitable manner known in the art.

In a further embodiment, generating the golden grid image includes removing a signature specific to the specimen from the reference image. As shown in step 306 of FIG. 3, the computer subsystem(s) may remove a specimen signature from the reference image. For example, the golden grid image is preferably free from specimen specific signatures such as color variation, etc. Such distortion correction may also be performed in any suitable manner known in the art.

In some embodiments, modifying the reference image includes stretching the reference image in one or more dimensions. In this manner, the golden grid image may be a processed image generated by stretching the reference image to the design grid. The reference image may be stretched in either or both of the x and y dimensions and to the same or different degrees in x and y. Although the modifying step may more commonly involve altering the overall dimensions of the reference image by stretching it in one or more dimensions, it is conceivable that in some instances modifying the reference image may include shrinking the reference image in one or more dimensions or some combination of stretching in one dimension and shrinking in the other. In any case, stretching and/or shrinking the reference image in one or more dimensions may be performed in any suitable manner known in the art.

In another embodiment, modifying the reference image includes rotation of the reference image. The reference image may be rotated in any suitable direction, e.g., clockwise or counterclockwise. Rotating the reference image in one or more dimensions to fit it to the design grid may be performed in combination with one or more other ways of modifying the reference image described herein.

In another embodiment, modifying the reference image includes interpolating pixels of the reference image to fit the design grid. For example, the golden grid image may be stretched with pixels in a uniform design grid through interpolation to correct optical distortion and image jitter caused by wafer stage movement. The interpolation may be performed in any suitable manner using any suitable method, algorithm, function, etc.

Two or more of the above steps may also be used in combination to generate the golden grid image. For example, the golden grid image may be generated by both removing random defects from the reference image and by stretching the reference image to the design grid. Other steps may also be performed in combination to generate the golden grid image and which steps are performed may be determined based on information about the inspection subsystem, specimen, etc. and/or by comparing the reference image to the design grid and determining which steps could advantageously be performed on the reference image to generate the golden grid image.

Figure 3:
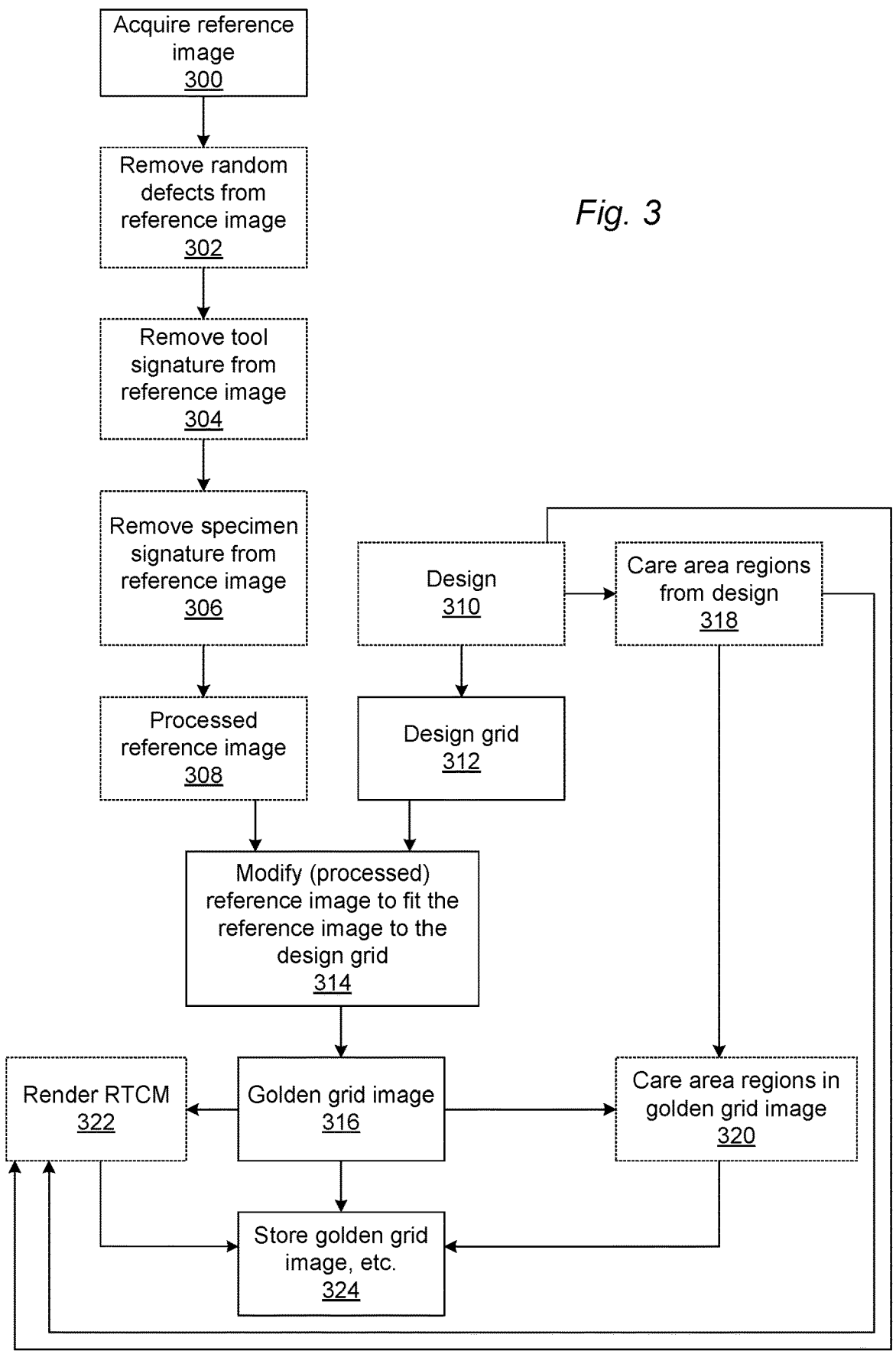
FIG. 3 is a flow chart illustrating an embodiment of steps performed by the one or more computer subsystems described herein in a setup phase.

In some such embodiments, processed reference image 308 shown in FIG. 3 may be generated by step 300 possibly in combination with one or more of steps 302, 304, and 306. If the computer subsystem(s) are not configured for performing steps 302, 304, and 306, then processed reference image 308 will simply be the acquired reference image.

As further shown in FIG. 3, design 310 for the specimen may be acquired by the computer subsystem(s) or by another system or method. The computer subsystem(s) or another system or method may generate or determine design grid 312 from the design. The one or more computer subsystem(s) may then use processed reference image 308 (or the acquired reference image) and design grid 312 as input to step 314 in which the computer subsystem(s) modify the (processed or acquired) reference image to fit the reference image to the design grid. The modifying performed in step 314 may include any of the modifying step(s) described herein such as stretching and/or rotating the reference image in one or more dimensions and/or interpolating pixels of the reference image to fit the design grid. The output of the modification step may therefore be golden grid image 316.

The computer subsystem(s) are further configured for storing the golden grid image for use in inspection of the specimen. For example, as shown in step 324 of FIG. 3, the computer subsystem(s) are configured for storing the golden grid image. The golden grid image may then be retrieved and used during runtime specimen inspection. The inspection includes aligning a test image of the specimen generated from the output of the inspection subsystem to the golden grid image. During runtime inspection, the test image is shifted, stretched, rotated, interpolated, or some combination thereof to align to the golden grid image. The computer subsystem(s) may be configured to store the golden grid image in a recipe or by generating a recipe for the inspection in which the aligning will be performed. A "recipe" as that term is used herein is defined as a set of instructions that can be used by a tool to perform a process on a specimen. In this manner, generating a recipe may include generating information for how a process is to be performed, which can then be used to generate the instructions for performing that process. The computer subsystem(s) may also be configured to store the golden grid image in a computer-readable storage medium separate from the inspection process recipe and to store any information that can be used to identify, access, and/or use the golden grid image (e.g., such as a file name and where it is stored) in the inspection process recipe.

The computer subsystem(s) may be configured for storing the golden grid image in any suitable computer-readable storage medium. The golden grid image may be stored with any of the results described herein and may be stored in any manner known in the art. The storage medium may include any storage medium described herein or any other suitable storage medium known in the art. After the golden grid image has been stored, the golden grid image can be accessed in the storage medium and used by any of the method or system embodiments described herein, formatted for display to a user, used by another software module, method, or system, etc.

In one embodiment, storing the golden grid image includes storing the golden grid image for use in the inspection of the specimen and inspection of at least one other specimen of the same type as the specimen. For example, the embodiments described herein may generate an inspection recipe as described above. That inspection recipe may then be stored and used by the embodiments described herein (and/or another system or method) to inspect the specimen and/or other specimens to thereby generate information (e.g., defect information) for the specimen and/or other specimens. In this manner, the golden grid image may be generated and stored once per specimen layer, and the golden grid image may be used for inspection of multiple specimens of the same layer. Of course, as in any inspection process, if the inspection of the specimen layer is updated, calibrated, modified, re-trained, etc., the golden grid image may also be updated, calibrated, modified, retrained, etc. in the same manner as any other inspection process parameter. Updating, calibrating, modifying, retraining, etc. the golden grid image may be performed in the same manner described herein for generating and storing a golden grid image. In this manner, the embodiments described herein may be configured for repeating the steps described herein at various times to modify a previously setup inspection process.

"Care areas" as they are commonly referred to in the art are areas on a specimen that are of interest for inspection purposes. Sometimes, care areas are used to differentiate between areas on the specimen that are inspected from areas on the specimen that are not inspected in an inspection process. In addition, care areas are sometimes used to differentiate between areas on the specimen that are to be inspected with one or more different parameters. For example, if a first area of a specimen is more critical than a second area on the specimen, the first area may be inspected with a higher sensitivity than the second area so that defects are detected in the first area with a higher sensitivity. Other parameters of an inspection process can be altered from care area to care area in a similar manner.

In some embodiments, the one or more computer subsystems are configured for defining one or more care area regions in the golden grid image, the inspection subsystem and the one or more computer subsystems are configured for performing the inspection of the specimen, and the inspection includes defining one or more care area regions in the test image based on results of aligning the test image to the golden grid image and the one or more care area regions defined in the golden grid image. For example, the one or more computer subsystems may perform care area region definition on the golden grid image. In one such example, as shown in step 318 of FIG. 3, the computer subsystem(s) or another system or method may generate care area regions from design. The care area regions may be generated from the design in any suitable manner known in the art, and the care area regions may have any suitable characteristics known in the art. As shown in step 320, the computer subsystem(s) may use the care area regions from design with the golden grid image 316 to define the care area regions in the golden grid image. The computer subsystem(s) may then store the care area regions in the golden grid image with the golden grid image in step 324.

In general, since the golden grid image has been modified to fit the design grid, the care area regions will have the same placement, coordinates, dimensions, etc. in the design and the golden grid image. However, by defining the care area regions in the golden grid image, when the test image for inspection is aligned to the golden grid image, the care area regions will be effectively defined in the test image. Since the same golden grid image may be used across different scans in inspection, care area region definition will advantageously be consistent. The inspection subsystem and computer subsystem(s) may perform the inspection and aligning the test image to the golden grid image as described further herein.

In another embodiment, the one or more computer subsystems are configured for rendering a runtime context map (RTCM) from the golden grid image and storing the RTCM for use in the inspection of the specimen. For example, as shown in step 322, the computer subsystem(s) may render the RTCM from golden grid image 316. Rendering the RTCM in step 322 may be performed using care area information generated in step 318, mask information from design 310, and golden grid image(s). In particular, the RTCM data is generated from the design so the design may be input to step 322. RTCM rendering generates RTCM region map, RTCM mask map, etc. on the golden grid (using pixel size in golden grid). The computer subsystem(s) may then store the rendered RTCM with the golden grid image in step 324. In step 324, the golden grid image may be stored with the rendered RTCM region/mask maps. The rendered RTCM region/mask map can be saved along with the golden grid image in a recipe to be used in inspection runtime.

RTCM rendering may be performed to assign each pixel to a specific region or multiple regions (with probabilities). RTCM may also be performed in any suitable manner known in the art, some examples of which are described in the above-referenced patent to Kulkarni et al. The embodiments described herein may be further configured for RTCM rendering as described in that patent.

RTCM may define care areas and/or other information, such as mask information for supercell/nanocell, using geometry information mainly in rectangular coordinates. RTCM care area definition is from design and is independent of the golden grid. During set up, RTCM may be rendered on top of the golden grid to generate a RTCM region map where each pixel on the golden grid is assigned to one (or more) regions. The rendered RTCM region map can be saved together with the golden grid image and used during runtime. Existing systems perform RTCM rendering in runtime, which has a throughput hit. With the saved RTCM region map, run time RTCM rendering time can be saved, and RTCM region map is consistent from run to run, tool to tool, etc. as long as the same recipe (with the same RTCM region map) is used.

In another embodiment, the one or more computer subsystems are configured for defining one or more mask regions in the golden grid image, the inspection subsystem and the one or more computer subsystems are configured for performing the inspection of the specimen, and the inspection includes defining one or more mask regions in the test image based on results of said aligning the test image to the golden grid image and the one or more mask regions defined in the golden grid image. In one such embodiment, a mask is used in supercell and nanocell. Each array region is sub-divided into mask sub-regions so that different recipes can be used for different sub-regions, e.g., to separate NMOS and PMOS into different sub-regions. These steps may be performed as described above, and the one or more mask regions may be defined in the test image by applying the RTCM to the aligned or modified test image as described further herein. For example, the one or more mask regions may be defined in the RTCM that is rendered and stored as described herein. As such, by applying the RTCM to the test image aligned to the golden grid image, the mask regions will be defined in the aligned test image. Alternatively, the mask regions may be defined separately from the RTCM, e.g., from design 310 in the same way that care areas are defined from the design in step 318. Those mask regions can be defined in the golden grid image in the same way as the care areas are, and the mask regions may be stored with the golden grid image as described further herein so that they can be accessed and applied during inspection as described further herein.

With golden grid, the region definition will be the same for the same pixel size if the image to design alignment is perfect. Context based inspection (CBI) RTCM generation can be performed only once during a training step as RTCM care area region rendering performed on the golden grid image. Performing the RTCM rendering in this manner can save RTCM rendering time in runtime. The golden grid image and RTCM region map may be generated and saved during setup and then used in runtime as described further herein. For example, the RTCM region map may be retrieved and used to define care area regions for defect detection per region.

In one such embodiment, the RTCM is used for inspection of at least one other specimen of the same type as the specimen. For example, if the RTCM region map is rendered on the golden grid image and saved in a database during setup, the RTCM region map may be retrieved in runtime thereby advantageously providing substantially consistent region definition across scans.

Figure 4:
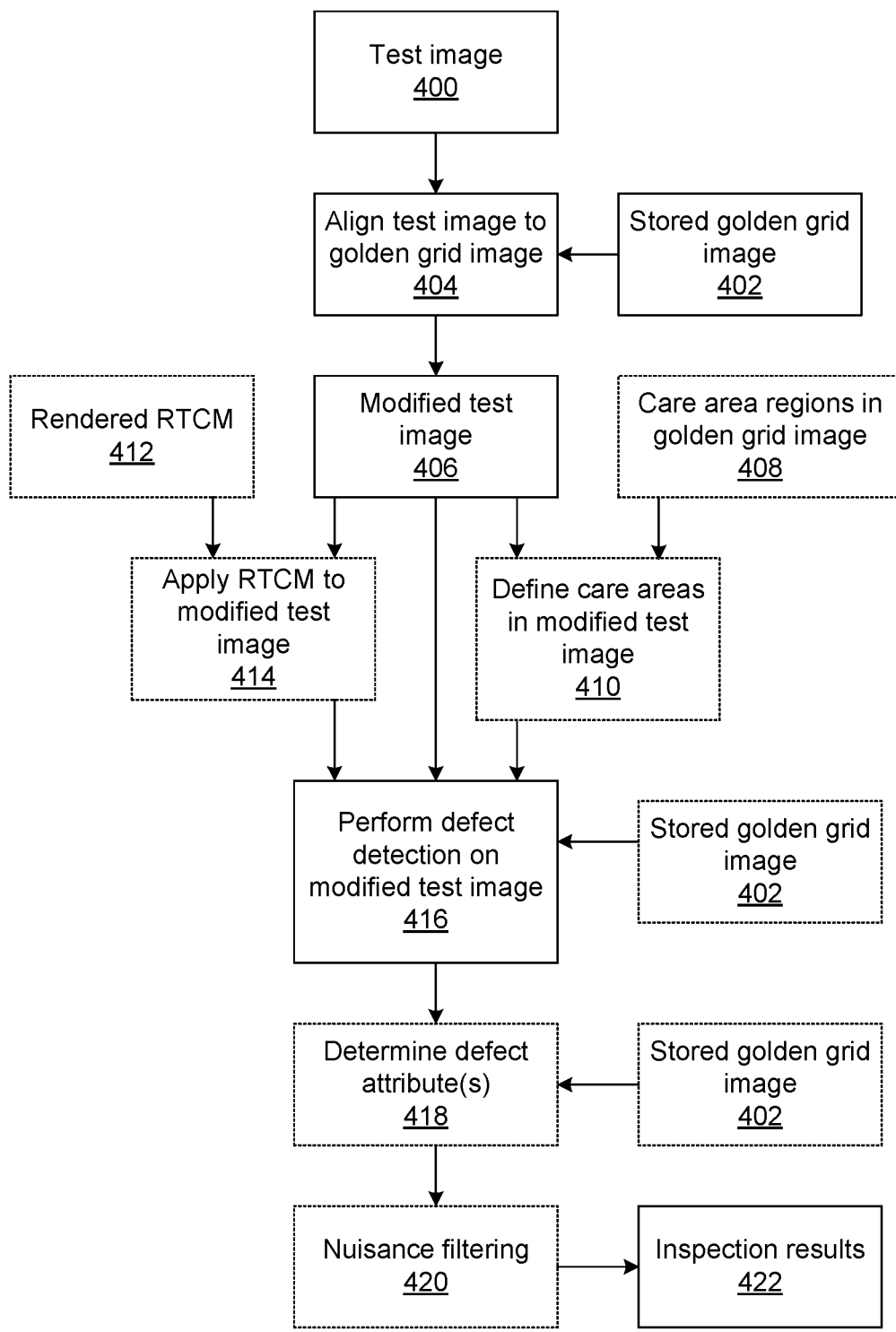
FIG. 4 is a flow chart illustrating an embodiment of steps performed by the one or more computer subsystems described herein in a runtime phase.

In an additional embodiment, aligning the test image to the golden grid image includes modifying the test image to thereby align the test image to the golden grid image. In one such example, as shown in FIG. 4, the computer subsystem(s) may use test image 400 and stored golden grid image 402 as input to step 404 in which the computer subsystem(s) align the test image to the golden grid image to thereby generate modified test image 406. For example, all runtime test images (e.g., test die images) may be shifted/interpolated to align to the golden grid image. In one such embodiment, test frames may be interpolated and/or shifted to align to the golden grid image using offsets measured between test and golden grid images during runtime. The test image may be shifted, interpolated, stretched, etc. as described further herein with respect to the reference image.

In one such embodiment, the inspection subsystem and the one or more computer subsystems are configured for performing the inspection of the specimen, and the inspection includes determining one or more parameters of a defect detection method based on results of aligning the test image to the golden grid image and detecting defects on the specimen by applying the defect detection method with the determined one or more parameters to the modified test image. For example, as described further herein, care area regions may be defined in the golden grid image and RTCM rendering may be performed using the golden grid image. The care area regions and/or the rendered RTCM may then be used to determine and control one or more parameters of the defect detection method that is applied to the modified test image.

In one such example, as shown in step 410 of FIG. 4, the computer subsystem(s) may define care areas in the modified test image using modified test image 406 and care area regions in the golden grid image 408. In particular, once the test image has been modified to align to the golden grid image, the care area regions defined in the golden grid image can be mapped to the modified test image. In another such example, as shown in step 414 of FIG. 4, the one or more computer subsystem(s) may apply rendered RTCM 412 to modified test image 406. In the same manner that the care area regions defined in the golden grid image can be mapped to the modified test image aligned thereto, the rendered RTCM from the golden grid image can be mapped to the modified test image.

Although care area regions 408 and rendered RTCM 412 are shown in FIG. 4 as different elements, the care area regions may be defined in the RTCM as described further herein. Therefore, the care area regions may be defined in the rendered RTCM which is mapped to the golden grid image. In this manner, the embodiments described herein may not need to perform define care areas in modified test image step 410. Instead, by performing apply RTCM to modified test image step 414, the care areas may also be defined in the modified test image. It is to be understood, however, that the RTCM may include context information other than and in addition to any care area information, and that other and additional information may also be applied to the modified test image in step 414. Therefore, whether the care areas are defined and applied using the RTCM related steps or are defined and applied in steps separate from the RTCM steps may be left up to a user and the specifics of the implementation.

In general, when the care area regions are setup and/or the RTCM is rendered, the user, the one or more computer subsystem(s), or another method or system will determine one or more parameters of the inspection process that are to be used with the care area regions and/or the RTCM. For example, during setup, the one or more computer subsystem(s) may determine which of the care area regions are to be inspected and with which defect detection parameter(s) such as threshold values. In this manner, by varying defect detection parameter(s) such as thresholds based on characteristics of the care area regions, different types of care area regions can be inspected with different sensitivities. In a similar manner, during setup, the one or more computer subsystem(s) may use the RTCM to assign different defect detection parameter(s) to portions of the golden grid image that have different contexts. Therefore, after the test image has been modified to align it to the golden grid image, the RTCM is also effectively mapped to the test image and the defect detection parameter(s) to be applied to different portions of the test image can be determined from the RTCM mapped thereto.

Since RTCM region map is generated during setup on top of the golden grid image, the RTCM region map is the same from scan to scan, tool to tool, etc. Similarly, that is true for the RTCM mask map. Similar to RTCM region data, mask data in RTCM can be rendered during set up to generate a consistent RTCM mask map. RTCM mask map may be defined in an array region to separate different array areas into separate mask areas similar to RTCM regions. Different recipes can then be applied to different RTCM mask areas. With consistent RTCM region map and mask map, defect detection results will advantageously be more stable across scans, tools, etc.

In general, therefore, the computer subsystem(s) may perform defect detection on the modified test image as shown in step 416 of FIG. 4 using a variety of inputs including at least the modified test image 406 but also possibly stored golden grid image 402, the care areas defined in the modified test image in step 410, and the RTCM applied to the modified test image in step 414. Although some ways are described herein to use these inputs for defect detection, it is noted that the inputs to step 416 shown in FIG. 4 may be used by a variety of defect detection methods and algorithms for detecting defects on the specimen. Such defect detection methods and algorithms include those used by inspection tools commercially available from KLA as well as other sources, possibly in either or both of their one-dimensional (1D) and 2D versions. A defect detection method that generates a 1D histogram for the detector output may be referred to as a 1D defect detection method. In contrast, a "2D defect detection algorithm" as that term is used herein is an algorithm that uses a 2D histogram with one axis being, for example, the median grey level of n>1 reference frames (y axis) and the x axis being the difference grey level. However, such defect detection methods and algorithms may also include those that do not necessarily require a reference for defect detection such as single image defect detection methods, which may be based on deep learning (DL) or machine learning (ML) technology. Some examples of ML based defect detection methods are described in U.S. Pat. No. 10,186,026 issued Jan. 22, 2019 to Karsenti et al., which is incorporated by reference as if fully set forth herein. The embodiments described herein may be further configured as described in this patent.

In another such embodiment, the inspection subsystem and the one or more computer subsystems are configured for performing the inspection of the specimen, and the inspection includes detecting defects on the specimen by subtracting the golden grid image from the modified test image. In this manner, defect detection may be performed using the modified test image, which has been interpolated, shifted, stretched, etc. to fit the test image to the golden grid image and therefore the golden grid of the design. In one such example, the golden grid image may be subtracted from the modified test image to generate a difference image, and in some defect detection methods, a threshold may be applied to pixels in the difference image. Pixels having a value above the threshold may be identified as defects or potential defects, and pixels that do not have a value above the threshold may not be identified as defects or potential defects. In general, however, any defect detection method that uses a test image as input can use the modified test image as input for defect detection. Therefore, the modified test images can be used in the same manner as any other test image after they have been generated, although the inventors believe that the modification to the test images described herein has not previously been used to generate modified test images that are used for defect detection.

In a further embodiment, the inspection subsystem and the one or more computer subsystems are configured for performing the inspection of the specimen, and the inspection includes detecting defects on the specimen based on the golden grid image and the test image and determining one or more attributes for the defects based on the golden grid image. For example, the golden grid image may be used during inspection to compute defect attributes. In one such example, the golden grid image may be saved in a database during setup and retrieved in runtime to compute golden grid based defect attributes. As shown in step 418 of FIG. 4, for example, the one or more computer subsystem(s) may determine defect attribute(s) using results of step 416 and stored golden grid image 402. The defect attribute(s) may be attributes of the stored golden grid image at the locations of the detected defects, which are easily determined since the modified test image has been aligned to the golden grid image.

The defect attributes may, however, also be information determined for or using the golden grid image. For example, as described further herein, RTCM rendering may be performed using the golden grid image. The rendered RTCM may determine various contexts (e.g., design information) for portions of the golden grid image as a function of position within the golden grid image. The defect attribute(s) may then be the context assigned to a location in the golden grid image corresponding to the location of a defect, again easily determined since the modified test image is aligned to the golden grid image. In general, any information that can be determined from the golden grid image about one or more of the golden grid image, the specimen, or the design for the specimen may be used as defect attributes by the embodiments described herein.

These attributes are therefore the same across scans and as a result are extremely stable. In other words, these defect attributes will be the same for each defect detected at the same location within the printed instances on the specimen (e.g., dies, etc.). These attributes may therefore be particularly advantageous for use in other steps such as nuisance filtering since nuisances and DOIs can be stably, repeatably, and substantially accurately separated from each other using such attributes. In addition, the golden grid image may be used to extract additional defect attributes. Such defect attributes may include, for example, the difference grey level when the golden grid image is subtracted from a modified test image.

In one such embodiment, the inspection also includes performing nuisance filtering of the defects based on the one or more attributes determined for the defects. For example, as shown in step 420 of FIG. 4, the one or more computer subsystems may perform nuisance filtering using the defect attribute(s) determined in step 418. Nuisance filtering may be performed in any suitable manner known in the art. For example, the defect attributes determined as described herein based on the golden grid image may be used in the same manner as any other defect attributes for nuisance filtering.

Since these attributes are the same across scans, the attributes are therefore extremely stable in nuisance removal. In particular, with the golden grid images described herein, both RTCM region definition and pixel locations can be consistent across scans. Consistent RTCM region definition and pixel locations across scans result in more stable defect attributes and reduced process variation across scans in terms of defect count stability. For example, in some currently used methods, defect attributes are computed from the image generated in the current scan. Since the image changes from scan to scan, the defect attributes also change. Nuisance filters use defect attributes. Therefore, if the defect attributes change from scan to scan, the defect counts after nuisance filtering will also change. However, in the embodiments described herein, those defect attributes from the golden grid image are constant across scans. Therefore, the results of nuisance filtering with golden grid based attributes will also be stable.

In some embodiments, the one or more computer subsystems are configured for re-training the inspection by acquiring a new reference image for an additional specimen of the same type as the specimen, modifying the new reference image to fit the new reference image to the design grid thereby generating a new golden grid image, and storing the new golden grid image for use in the inspection of the additional specimen. Since the golden grid image is stretched to the design grid with pixels in a uniform design grid, the golden grid image is consistent even after retraining (golden grid image regeneration) on the same tool or on different tools from different modes. Acquiring the new reference image, modifying the new reference image, and storing the new golden grid image may otherwise be performed as described further herein. The additional specimen may be of the same type as the specimen in that it is fabricated using the same fabrication process steps as the specimen and is therefore of the same layer and type as the specimen. In this manner, the inspection process that is setup as described herein for a specimen can be updated, modified, calibrated, etc. by performing the steps for a different specimen of the same type. Such updating, modifying, calibrating, etc. of the inspection process may be performed periodically or whenever it is deemed appropriate or necessary.

In a further embodiment, the inspection subsystem is configured to generate the output for the specimen with first and second modes of the inspection subsystem, the reference image is acquired for the first mode, the one or more computer subsystems are configured for acquiring an additional reference image for the specimen and the second mode, modifying the additional reference image to fit the additional reference image to the design grid thereby generating an additional golden grid image, and storing the additional golden grid image for use in the inspection of the specimen, and the inspection includes aligning a test image of the specimen generated from the output of the inspection subsystem generated with the second mode to the additional golden grid image. In this manner, the embodiments described herein may generate different golden grid images for different modes. For example, the computer subsystem(s) may generate a first golden grid image for a DF mode and a second golden grid image for a BF mode. In another example, for two DF modes that use different scattering angles, the computer subsystem(s) may generate a first golden grid image for one of the two DF modes and a second golden grid image for another of the two DF modes. Different golden grid images may be generated by the computer subsystem(s) when the inspection is performed with multiple modes because different modes typically require different reference images due to the differences in the images generated with the different modes.

By generating golden grid images having pixels in a uniform design grid across different modes, inspection using multiple modes can have the same pixelization. Having the same pixelization in multiple modes can benefit multi-mode sensitivity. For example, since the reference images for different modes can be fit to the same uniform design grid, the different resulting golden grid images can have the same pixelization, meaning that corresponding pixels in the different golden grid images correspond to the same area in the design for the specimen. Therefore, pixels in different golden grid images that correspond to the same area in the design for the specimen can be inspected with the same (optimal) sensitivity. As a result, multi-mode inspection performed using the golden grid images generated as described herein can detect more DOIs and suppress more nuisances than other methods and systems for multi-mode inspection. In addition, since the multi-mode golden grid images are fit to the same uniform design grid, any other steps such as defect classification or filtering performed using the multi-mode images or information determined therefrom may perform better than currently used methods and systems because the mode-to-mode images or information are better aligned to each other via the golden grid.

In an additional embodiment, storing the golden grid image includes storing the golden grid image for use in the inspection of the specimen and inspection of at least one other specimen of the same type as the specimen, and the inspection of the at least one other specimen includes aligning a test image of the at least one other specimen generated from output of an additional inspection subsystem responsive to energy detected from the at least one other specimen to the golden grid image. In this manner, the same golden grid image may be used for inspection of different specimens (of the same type) on different inspection tools. With the golden grid image having pixels in a uniform design grid across different tools, inspection using different inspection subsystems can have the same pixelization. Having the same pixelization in different inspection subsystems can benefit multi-tool sensitivity.

As shown in step 422 of FIG. 4, the one or more computer subsystems may generate inspection results, which may include the results of any of the steps shown in FIG. 4. The inspection results may include information for the detected defects such as defect IDs, location, etc., of the bounding boxes of the detected defects, sizes, detection scores, information about defect classifications such as class labels or IDs, etc., or any such suitable information known in the art. The results for the defects may be generated by the computer subsystem(s) in any suitable manner. The results for the defects may have any suitable form or format such as a standard file type. The computer subsystem(s) may generate the results and store the results such that the results can be used by the computer subsystem(s) and/or another system or method to perform one or more functions for the specimen or another specimen of the same type.

The computer subsystem(s) may be configured for storing the information for the detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

Results and information generated by performing the inspection on the specimen or other specimens of the same type may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer subsystem(s) may be configured to determine one or more changes to a process that was or will be performed on a specimen inspected as described herein based on the detected defect(s). The changes to the process may include any suitable changes to one or more parameters of the process. The computer subsystem(s) preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem(s) may determine such changes in any suitable manner known in the art.

Those changes can then be sent to a semiconductor fabrication system (not shown) or a storage medium (not shown) accessible to the computer subsystem(s) and the semiconductor fabrication system. The semiconductor fabrication system may or may not be part of the system embodiments described herein. For example, the computer subsystem(s) and/or inspection subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

As described herein, therefore, the embodiments can be used to setup a new inspection process or recipe. The embodiments may also be used to modify an existing inspection process or recipe, whether that is an inspection process or recipe that was used for the specimen or was created for one specimen and is being adapted for another specimen. However, the embodiments described herein are not limited to inspection process creation or modification. For example, the embodiments described herein can also be used to setup or modify a process for metrology, defect review, etc. in a similar manner. In particular, generating a golden grid image as described herein can be performed regardless of the process that is being setup or revised. The embodiments described herein can therefore be used not just for setting up or modifying an inspection process but can be used for setting up or modifying any quality control type process performed on the specimens described herein.

The embodiments described herein provide a number of advantages over previously used methods and systems for setting up inspection of a specimen. For example, empirical data generated by the inventors shows defect count stability improvements using golden grid images and golden grid based RTCM region map. The embodiments described herein can also improve inspection tool stability in terms of defect count stability before and after nuisance filtering. In one such example, the golden grid images described herein provide consistent region definition, which can improve the stability of most defect attributes thereby improving defect count stability after nuisance filtering.

In another example, as described further herein, the golden grid image is a processed specimen image which is generated during a training step and is stretched to the design grid. RTCM care areas can be directly rendered on the golden grid image and are the same from scan to scan. Test frames in runtime are shifted/interpolated to align to the golden grid with pixels in uniform design grid. As a result, RTCM region map is consistent from scan to scan, and inspection tool stability is improved when using the same recipe across different specimen scans. In addition, RTCM rendering may be performed only once during setup on the golden grid image, which can save significant amounts of time usually required for runtime RTCM rendering. RTCM rendering may also be performed only once at pixel-to-design alignment (PDA) setup. As a result, runtime RTCM rendering time can be saved, which is significant particularly for back end of line (BEOL) wafers and other relatively complex specimens. For example, the denser and/or more complex RTCM care area regions require more RTCM rendering time.

In a further example, the golden grid image can be used to extract defect golden grid-based contrast and context features which can be used in place of existing reference based contrast and context features. The golden grid image is the same from scan to scan. Therefore, the golden grid based attributes are the same (will have no variation) from scan to scan. When using the golden grid based defect attributes in nuisance filtering, there is no defect count variation due to these attributes.

In another example, since the golden grid image is stretched with pixels in a uniform design grid, the pixel locations (relative to design after image to design alignment) are consistent across different tools, different scans, and different modes, which should result in better inspection tool process variation stability across scans, tools, and modes. For example, if PDA alignment between the reference image and the design is "perfect," the golden grid image coordinates will be "perfectly" aligned with the digital coordinate system (or the coordinates in design space). The intensities of the pixels in the golden grid image are from the reference image acquired during the setup scan. However, from tool to tool and mode to mode, for the same runtime pixel size (e.g., 50 nm for instance), the golden grid image coordinates are consistent in terms of the "perfect" digital coordinate system. The embodiments described herein can also improve the stability of the dynamic range of runtime images at the frame level. For example, during runtime, before inspection, a test image may be first matched to the golden grid image on the smaller block level (for instance, 128 pixels by 128 pixels) for each frame. As a result, runtime matched images can have stable dynamic range as in the golden grid image.

The above described advantages of the embodiments are provided by a number of new features of the systems and methods described herein. One such new feature is the golden grid image which is an image stretched to the design grid. Another such feature is the RTCM rendering on the golden grid image which results in consistent region definition. An additional such feature is that RTCM rendering only needs to be done once in setup and runtime RTCM rendering can be saved. A further such feature is that golden grid based context and contrast attributes can be used for nuisance filtering. An additional such feature is that the golden grid image can be used as the y axis in 2D based defect detection. For example, some defect detection methods use a reference to detect defects on a specimen. Some such methods use the reference to generate difference images by subtracting the reference from a test image. In addition, some such methods may use the reference along with the difference image to detect the defects. In one such example, a characteristic of the reference such as a median grey level may be plotted on the y axis, the difference image grey level may be plotted on the x axis, and a threshold may be applied to the resulting 2D plot to detect defects on the specimen. One example of a defect detection method that performs in such a way is the multi-die auto-thresholding (MDAT) algorithm that is used by some inspection tools commercially available from KLA. By using the golden grid image characteristic(s) for defect detection rather than a currently used reference, the embodiments described herein will provide greater stability for defect detection. Still other such features include that better defect attribute stability is provided by using the golden grid image.

Each of the embodiments of each of the systems described above may be combined together into one single embodiment.

Another embodiment relates to a computer-implemented method for setting up inspection of a specimen. The method includes acquiring a reference image for a specimen and modifying the reference image to fit the reference image to a design grid thereby generating a golden grid image. The method further includes storing the golden grid image for use in inspection of the specimen. The inspection includes aligning a test image of the specimen generated from output of an inspection subsystem responsive to energy detected from the specimen to the golden grid image. The acquiring, modifying, and storing steps are performed by one or more computer subsystems, which may be configured according to any of the embodiments described herein.

Each of the steps of the method may be performed as described further herein. The method may also include any other step(s) that can be performed by the inspection subsystem and/or computer subsystem(s) described herein. The method described above may be performed by any of the system embodiments described herein.

Figure 5:
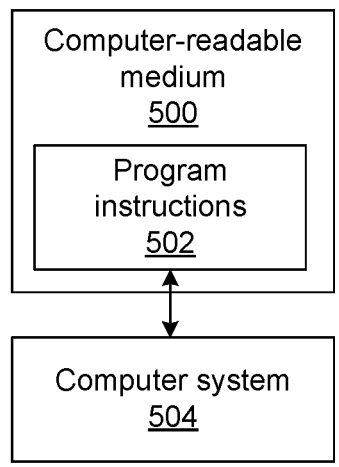
FIG. 5 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for setting up inspection of a specimen. One such embodiment is shown in FIG. 5. In particular, as shown in FIG. 5, non-transitory computer-readable medium 500 includes program instructions 502 executable on computer system 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 504 may be configured according to any of the embodiments described herein.

Further modifications and alternative embodiments of various aspects of the invention will be apparent to those skilled in the art in view of this description. For example, methods and systems for setting up inspection of a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for setting up inspection of a specimen, comprising:
an inspection subsystem configured to generate output responsive to energy detected from a specimen; and
one or more computer subsystems configured for:
acquiring a reference image of the specimen;
modifying the reference image to fit the reference image to a design grid thereby generating a golden grid image; and
storing the golden grid image for use in inspection of the specimen, wherein the inspection comprises aligning a test image of the specimen generated from the output of the inspection subsystem to the golden grid image.

2. The system of claim 1, wherein generating the golden grid image comprises removing random defects from the reference image.

3. The system of claim 1, wherein generating the golden grid image comprises removing a signature specific to the inspection subsystem from the reference image.

4. The system of claim 1, wherein generating the golden grid image comprises removing a signature specific to the specimen from the reference image.

5. The system of claim 1, wherein modifying the reference image comprises stretching the reference image in one or more dimensions.

6. The system of claim 1, wherein modifying the reference image comprises rotation of the reference image.

7. The system of claim 1, wherein modifying the reference image comprises interpolating pixels of the reference image to fit the design grid.

8. The system of claim 1, wherein the one or more computer subsystems are further configured for defining one or more care area regions in the golden grid image, wherein the inspection subsystem and the one or more computer subsystems are further configured for performing the inspection of the specimen, and wherein the inspection further comprises defining one or more care area regions in the test image based on results of said aligning the test image to the golden grid image and the one or more care area regions defined in the golden grid image.

9. The system of claim 1, wherein the one or more computer subsystems are further configured for defining one or more mask regions in the golden grid image, wherein the inspection subsystem and the one or more computer subsystems are further configured for performing the inspection of the specimen, and wherein the inspection further comprises defining one or more mask regions in the test image based on results of said aligning the test image to the golden grid image and the one or more mask regions defined in the golden grid image.

10. The system of claim 1, wherein the one or more computer subsystems are further configured for rendering a runtime context map from the golden grid image and storing the runtime context map for use in the inspection of the specimen.

11. The system of claim 10, wherein the runtime context map is used for inspection of at least one other specimen of the same type as the specimen.

12. The system of claim 1, wherein the inspection subsystem and the one or more computer subsystems are further configured for performing the inspection of the specimen, and wherein the inspection further comprises detecting defects on the specimen based on the golden grid image and the test image and determining one or more attributes for the defects based on the golden grid image.

13. The system of claim 12, wherein the inspection further comprises performing nuisance filtering of the defects based on the one or more attributes determined for the defects.

14. The system of claim 1, wherein aligning the test image to the golden grid image comprises modifying the test image to thereby align the test image to the golden grid image.

15. The system of claim 14, wherein the inspection subsystem and the one or more computer subsystems are further configured for performing the inspection of the specimen, and wherein the inspection further comprises determining one or more parameters of a defect detection method based on results of said aligning the test image to the golden grid image and detecting defects on the specimen by applying the defect detection method with the determined one or more parameters to the modified test image.

16. The system of claim 14, wherein the inspection subsystem and the one or more computer subsystems are further configured for performing the inspection of the specimen, and wherein the inspection further comprises detecting defects on the specimen by subtracting the golden grid image from the modified test image.

17. The system of claim 1, wherein storing the golden grid image comprises storing the golden grid image for use in the inspection of the specimen and inspection of at least one other specimen of the same type as the specimen.

18. The system of claim 1, wherein the one or more computer subsystems are further configured for re-training the inspection by acquiring a new reference image of an additional specimen of the same type as the specimen, modifying the new reference image to fit the new reference image to the design grid thereby generating a new golden grid image, and storing the new golden grid image for use in the inspection of the additional specimen.

19. The system of claim 1, wherein the inspection subsystem is further configured to generate the output for the specimen with first and second modes of the inspection subsystem, wherein the reference image is acquired for the first mode, wherein the one or more computer subsystems are further configured for acquiring an additional reference image of the specimen and the second mode, modifying the additional reference image to fit the additional reference image to the design grid thereby generating an additional golden grid image, and storing the additional golden grid image for use in the inspection of the specimen, and wherein the inspection further comprises aligning a test image of the specimen generated from the output of the inspection subsystem generated with the second mode to the additional golden grid image.

20. The system of claim 1, wherein storing the golden grid image comprises storing the golden grid image for use in the inspection of the specimen and inspection of at least one other specimen of the same type as the specimen, and wherein the inspection of the at least one other specimen comprises aligning a test image of the at least one other specimen generated from output of an additional inspection subsystem responsive to energy detected from the at least one other specimen to the golden grid image.

21. The system of claim 1, wherein the specimen is a wafer.

22. The system of claim 1, wherein the inspection subsystem is a light-based inspection subsystem.

23. The system of claim 1, wherein the inspection subsystem is an electron-based inspection subsystem.

24. A non-transitory computer-readable medium, storing program instructions executable on a computer system for performing a computer-implemented method for setting up inspection of a specimen, wherein the computer-implemented method comprises:
acquiring a reference image of a specimen;
modifying the reference image to fit the reference image to a design grid thereby generating a golden grid image; and
storing the golden grid image for use in inspection of the specimen, wherein the inspection comprises aligning a test image of the specimen generated from output of an inspection subsystem responsive to energy detected from the specimen to the golden grid image, and wherein said acquiring, modifying, and storing are performed by the computer system.

25. A computer-implemented method for setting up inspection of a specimen, comprising:
acquiring a reference image of a specimen;
modifying the reference image to fit the reference image to a design grid thereby generating a golden grid image; and
storing the golden grid image for use in inspection of the specimen, wherein the inspection comprises aligning a test image of the specimen generated from output of an inspection subsystem responsive to energy detected from the specimen to the golden grid image, and wherein said acquiring, modifying, and storing are performed by one or more computer subsystems.

* * * * *